(12) United States Patent
Cheng

(10) Patent No.: US 11,398,745 B2
(45) Date of Patent: Jul. 26, 2022

(54) WIRELESS CHARGING AND COMMUNICATION CIRCUIT, WIRELESS ELECTRONIC DEVICE, AND WIRELESS CHARGING AND COMMUNICATION CIRCUIT SYSTEM

(71) Applicant: BOE TECHNOLOGY GROUP CO., LTD., Beijing (CN)

(72) Inventor: Xinyi Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 220 days.

(21) Appl. No.: 16/622,534

(22) PCT Filed: Feb. 18, 2019

(86) PCT No.: PCT/CN2019/075398
§ 371 (c)(1),
(2) Date: Dec. 13, 2019

(87) PCT Pub. No.: WO2019/227977
PCT Pub. Date: Dec. 5, 2019

(65) Prior Publication Data
US 2020/0212703 A1 Jul. 2, 2020

(30) Foreign Application Priority Data

May 29, 2018 (CN) .......................... 201810530497.6

(51) Int. Cl.
*H02J 7/02* (2016.01)
*H02J 50/12* (2016.01)
(Continued)

(52) U.S. Cl.
CPC .............. *H02J 7/02* (2013.01); *G06K 19/071* (2013.01); *H02J 50/12* (2016.02); *H02J 50/80* (2016.02)

(58) Field of Classification Search
CPC .... H02J 7/02; H02J 50/80; H02J 50/12; H02J 5/005; H02J 7/025; H02J 50/10; G06K 19/071; H02M 3/335
See application file for complete search history.

(56) References Cited

U.S. PATENT DOCUMENTS

2004/0039423 A1* 2/2004 Dolgin ............... A61N 1/37223
607/27
2012/0049791 A1 3/2012 Tanabe
(Continued)

FOREIGN PATENT DOCUMENTS

CN 101458773 A 6/2009
CN 101694953 A 4/2010
(Continued)

OTHER PUBLICATIONS

First Chinese Office Action issued by the Chinese Patent Authority in the corresponding Chinese Patent Application No. 201810530497.6 dated Jun. 1, 2020.

*Primary Examiner* — Nghia M Doan
(74) *Attorney, Agent, or Firm* — Dilworth & Barrese, LLP.; Michael J. Musella, Esq.

(57) ABSTRACT

A charging circuit, an electronic device and a charging circuit system are provided. The charging circuit includes a receiving circuit and a signal processing circuit coupled to the receiving circuit; the receiving circuit is configured to receive electric energy wirelessly transmitted by a transmitting circuit and wirelessly transmit a feedback signal to the transmitting circuit according to the electric energy; and the signal processing circuit is configured to receive a control signal wirelessly transmitted by the transmitting circuit and process the control signal.

11 Claims, 10 Drawing Sheets

(51) Int. Cl.
   *H02J 50/80*   (2016.01)
   *G06K 19/07*   (2006.01)

(56) References Cited

U.S. PATENT DOCUMENTS

| | | | | |
|---|---|---|---|---|
| 2013/0254570 A1* | 9/2013 | Tsai | ............ | G06F 1/12 |
| | | | | 713/322 |
| 2014/0240099 A1* | 8/2014 | Chuang | ............ | H02J 50/12 |
| | | | | 340/10.5 |
| 2014/0246923 A1 | 9/2014 | Riehl et al. | | |
| 2015/0061604 A1 | 3/2015 | Chuang et al. | | |
| 2015/0341087 A1* | 11/2015 | Moore | ............ | H02J 50/50 |
| | | | | 455/77 |
| 2017/0116443 A1 | 4/2017 | Bolic et al. | | |

FOREIGN PATENT DOCUMENTS

| | | |
|---|---|---|
| CN | 201492814 U | 6/2010 |
| CN | 102386685 A | 3/2012 |
| CN | 202443486 U | 9/2012 |
| CN | 104158269 A | 11/2014 |
| CN | 104426210 B | 9/2016 |
| CN | 106787265 A | 5/2017 |
| CN | 206211578 U | 5/2017 |
| CN | 106849297 A | 6/2017 |
| CN | 206406776 U | 8/2017 |
| CN | 206542337 U | 10/2017 |
| CN | 107968490 A | 4/2018 |
| CN | 108695956 A | 10/2018 |
| WO | 2018004130 A1 | 1/2018 |

\* cited by examiner

WIRELESS CHARGING AND COMMUNICATION CIRCUIT, WIRELESS ELECTRONIC DEVICE, AND WIRELESS CHARGING AND COMMUNICATION CIRCUIT SYSTEM The present application claims priority of Chinese Patent Application No. 201810530497.6, filed on May 29, 2018, the disclosure of which is incorporated herein by reference in its entirety as part of the present application.

TECHNICAL FIELD

Embodiments of the present disclosure relate to a wireless charging and communication circuit, a wireless electronic device, and a wireless charging and communication circuit system.

BACKGROUND

Passive electronic tags (also called passive tags) do not have built-in batteries. In a case where the electronic tags are outside a reading range of a reader, the electronic tags are in a passive state. In a case where the electronic tags are within the reading range of the reader, the electronic tags can be wirelessly charged by a wireless charging circuit.

SUMMARY

At least one embodiment of the present disclosure provides a wireless charging and communication circuit, which includes a receiving circuit and a signal processing circuit electrically connected to each other; the receiving circuit is configured to receive electric energy wirelessly transmitted by a transmitting circuit and wirelessly transmit a feedback signal to the transmitting circuit according to the electric energy; and the signal processing circuit is configured to receive a control signal wirelessly transmitted by the transmitting circuit and process the control signal.

For example, in the wireless charging and communication circuit provided by an embodiment of the present disclosure, the receiving circuit includes a first energy storage circuit, a first capacitor, a rectification circuit, and a feedback circuit; a first terminal of the first energy storage circuit is electrically connected to a first terminal of the first capacitor, a second terminal of the first energy storage circuit is electrically connected to a first terminal of the rectification circuit, and the first energy storage circuit is configured to receive the electric energy wirelessly transmitted by the transmitting circuit; a second terminal of the first capacitor is electrically connected to a second terminal of the rectification circuit; a third terminal of the rectification circuit is electrically connected to a first voltage terminal, and the rectification circuit is configured to convert the electric energy into a direct-current voltage and output the direct-current voltage to the feedback circuit; and the feedback circuit is electrically connected to the rectification circuit, and is configured to generate the feedback signal according to the direct-current voltage and wirelessly transmit the feedback signal to the transmitting circuit through the first energy storage circuit.

For example, in the wireless charging and communication circuit provided by an embodiment of the present disclosure, the feedback circuit comprises a load modulation control terminal, a first switch sub-circuit, a load modulation resistor, and a load resistor; the load modulation control terminal is electrically connected to a first terminal of the first switch sub-circuit; a second terminal of the first switch sub-circuit is electrically connected to a first terminal of the load modulation resistor, a third terminal of the first switch sub-circuit is electrically connected to the first voltage terminal, and the first switch sub-circuit is configured to receive a modulation signal, input from the load modulation control terminal, for modulating a load and to be turned on or turned off according to the modulation signal; a first terminal of the load resistor is electrically connected to a second terminal of the load modulation resistor and the rectification circuit, and a second terminal of the load resistor is electrically connected to the first voltage terminal; and the load modulation resistor and the load resistor are configured to modulate a resistance value of the feedback circuit, according to a turn-on state and a turn-off state of the first switch sub-circuit, to form the feedback signal.

For example, in the wireless charging and communication circuit provided by an embodiment of the present disclosure, the feedback circuit comprises a load modulation control terminal, a second switch sub-circuit, a load modulation capacitor, and a matching capacitor; the load modulation control terminal is electrically connected to a first terminal of the second switch sub-circuit; a second terminal of the second switch sub-circuit is electrically connected to a first terminal of the load modulation capacitor, and a third terminal of the second switch sub-circuit is electrically connected to the first voltage terminal; a first terminal of the matching capacitor is electrically connected to the second terminal of the first capacitor, and a second terminal of the matching capacitor is electrically connected to the second terminal of the first energy storage circuit; and a second terminal of the load modulation capacitor is electrically connected to the first terminal of the matching capacitor.

For example, in the wireless charging and communication circuit provided by an embodiment of the present disclosure, the signal processing circuit comprises a decoding circuit, and the decoding circuit is electrically connected to the receiving circuit; and the decoding circuit is configured to receive the control signal wirelessly transmitted by the transmitting circuit and decode the control signal.

For example, in the wireless charging and communication circuit provided by an embodiment of the present disclosure, the decoding circuit comprises a first signal input terminal, a second signal input terminal, a high-pass filtering circuit, a switch circuit, a third capacitor, a resistance-capacitance charging circuit, a comparison circuit, a fourth capacitor, and a signal output terminal; the first signal input terminal is electrically connected to the receiving circuit and is configured to receive the control signal transmitted by the transmitting circuit; a first terminal of the high-pass filtering circuit is electrically connected to the first signal input terminal, and a second terminal of the high-pass filtering circuit is electrically connected to a first terminal of the switch circuit; a second terminal of the switch circuit is electrically connected to the comparison circuit, and a third terminal of the switch circuit is electrically connected to a first voltage terminal; a first terminal of the third capacitor is electrically connected to the second signal input terminal, and a second terminal of the third capacitor is electrically connected to the first voltage terminal; a first terminal of the resistance-capacitance charging circuit is electrically connected to the second signal input terminal, and a second terminal of the resistance-capacitance charging circuit is electrically connected to the first voltage terminal; the comparison circuit is electrically connected to the resistance-capacitance charging circuit, the second signal input terminal, the signal output terminal, and the first voltage terminal; and a first terminal of the fourth capacitor is electrically connected to the signal output terminal, and a second terminal of the fourth capacitor is electrically connected to the first voltage terminal.

For example, in the wireless charging and communication circuit provided by an embodiment of the present disclosure, the comparison circuit comprises a comparator and a logic inversion circuit, and the decoding circuit further comprises a resistance voltage division circuit; a non-inverting terminal of the comparator is electrically connected to the second terminal of the switch circuit, an inverting terminal of the comparator is electrically connected to the resistance voltage division circuit, a first power supply terminal of the comparator is electrically connected to the second signal input terminal, a second power supply terminal of the comparator is electrically connected to the first voltage terminal, and an output terminal of the comparator is electrically connected to a first input terminal of the logic inversion circuit; a second input terminal of the logic inversion circuit is electrically connected to the second signal input terminal, and an output terminal of the logic inversion circuit is electrically connected to the signal output terminal; and a first terminal of the resistance voltage division circuit is electrically connected to the second signal input terminal, and a second terminal of the resistance voltage division circuit is electrically connected to the first voltage terminal.

For example, in the wireless charging and communication circuit provided by an embodiment of the present disclosure, the comparison circuit comprises a trigger circuit, and the decoding circuit further comprises a fifth capacitor; a first trigger terminal of the trigger circuit and a second trigger terminal of the trigger circuit are both electrically connected to the second terminal of the switch circuit, a power supply terminal of the trigger circuit and a reset terminal of the trigger circuit are both electrically connected to the second signal input terminal, a control terminal of the trigger circuit is electrically connected to a first terminal of the fifth capacitor, a discharge terminal of the trigger circuit and a ground terminal of the trigger circuit are both electrically connected to the first voltage terminal, and an output terminal of the trigger circuit is electrically connected to the signal output terminal; and a second terminal of the fifth capacitor is electrically connected to the first voltage terminal.

At least one embodiment of the present disclosure also provides a wireless electronic device, which includes a main controller, a communication controller, a power receiving controller, and the wireless charging and communication circuit according to any one of the embodiments of the present disclosure; the power receiving controller and the communication controller are both electrically connected to the wireless charging and communication circuit; and the power receiving controller and the communication controller are both electrically connected to the main controller.

For example, the wireless electronic device provided by an embodiment of the present disclosure further includes an electronic tag, and the electronic tag is electrically connected to the power receiving controller.

For example, in the wireless electronic device provided by an embodiment of the present disclosure, the electronic tag comprises an electronic ink screen, and the electronic ink screen is configured to be supplied with power by the power receiving controller.

At least one embodiment of the present disclosure also provides a wireless charging and communication circuit, which includes a transmitting circuit, and the transmitting circuit is configured to wirelessly transmit electric energy to a receiving circuit, receive a feedback signal of the receiving circuit, and wirelessly transmit a control signal to the receiving circuit.

For example, in the wireless charging and communication circuit provided by an embodiment of the present disclosure, the transmitting circuit comprises a control circuit and a second energy storage circuit electrically connected to each other, and the control circuit is also electrically connected to a power supply other than the wireless charging and communication circuit.

For example, in the wireless charging and communication circuit provided by an embodiment of the present disclosure, the control circuit comprises a third energy storage circuit, a unidirectional conduction sub-circuit, a third switch sub-circuit, a feedback detection resistor, a load modulation feedback terminal, a power input terminal, and a third signal input terminal; a first terminal of the third energy storage circuit is electrically connected to the power input terminal, and a second terminal of the third energy storage circuit is electrically connected to a first terminal of the second energy storage circuit; a first terminal of the unidirectional conduction sub-circuit is electrically connected to a second terminal of the second energy storage circuit, and a second terminal of the unidirectional conduction sub-circuit is electrically connected to the first terminal of the third energy storage circuit; a first terminal of the third switch sub-circuit is electrically connected to the second terminal of the second energy storage circuit, a second terminal of the third switch sub-circuit is electrically connected to a first terminal of the feedback detection resistor and the load modulation feedback terminal, a third terminal of the third switch sub-circuit is electrically connected to the third signal input terminal, and the third switch sub-circuit is configured to be turned on or turned off according to a charging control signal input by the third signal input terminal; and a second terminal of the feedback detection resistor is electrically connected to a first voltage terminal.

For example, in the wireless charging and communication circuit provided by an embodiment of the present disclosure, the third switch sub-circuit is a field-effect transistor, and the first terminal of the third switch sub-circuit, the second terminal of the third switch sub-circuit, and the third terminal of the third switch sub-circuit are respectively a drain electrode of the field-effect transistor, a source electrode of the field-effect transistor, and a gate electrode of the field-effect transistor; and the unidirectional conduction sub-circuit is a diode, and the first terminal of the unidirectional conduction sub-circuit and the second terminal of the unidirectional conduction sub-circuit are a positive electrode of the diode and a negative electrode of the diode, respectively.

For example, in the wireless charging and communication circuit provided by an embodiment of the present disclosure, the control circuit comprises a fourth switch sub-circuit, a fourth signal input terminal, a fifth switch sub-circuit, a fifth signal input terminal, a third energy storage circuit, a power input terminal, a feedback detection resistor, and a load modulation feedback terminal; a first terminal of the fourth switch sub-circuit is electrically connected to the power input terminal, a second terminal of the fourth switch sub-circuit is electrically connected to a first terminal of the third energy storage circuit, a third terminal of the fourth switch sub-circuit is electrically connected to the fourth signal input terminal, and the fourth switch sub-circuit is configured to be turned on or turned off according to a first charging control signal input by the fourth signal input terminal; a first terminal of the fifth switch sub-circuit is electrically connected to the second terminal of the fourth switch sub-circuit, a second terminal of the fifth switch sub-circuit is electrically connected to a first terminal of the feedback detection resistor, a third terminal of the fifth switch sub-circuit is electrically connected to the fifth signal input terminal, and the fifth switch sub-circuit is configured to be turned on or turned off according to a second charging control signal input by the fifth signal input terminal; the first terminal of the feedback detection resistor is electrically connected to the load modulation feedback terminal, a second terminal of the feedback detection resistor is electrically connected to a first voltage terminal, and the feedback detection resistor is configured to respond to the feedback signal transmitted by the receiving circuit and output the feedback signal through the load modulation feedback terminal; and a second terminal of the third energy storage circuit is connected to a first terminal of the second energy storage circuit, and a second terminal of the second energy storage circuit is electrically connected to the first voltage terminal.

For example, in the wireless charging and communication circuit provided by an embodiment of the present disclosure, the fourth switch sub-circuit is a first field-effect transistor, and the first terminal of the fourth switch sub-circuit, the second terminal of the fourth switch sub-circuit, and the third terminal of the fourth switch sub-circuit are respectively a drain electrode of the first field-effect transistor, a source electrode of the first field-effect transistor, and a gate electrode of the first field-effect transistor; and the fifth switch sub-circuit is a second field-effect transistor, and the first terminal of the fifth switch sub-circuit, the second terminal of the fifth switch sub-circuit, and the third terminal of the fifth switch sub-circuit are respectively a drain electrode of the second field-effect transistor, a source electrode of the second field-effect transistor, and a gate electrode of the second field-effect transistor.

At least one embodiment of the present disclosure also provides a wireless electronic device, which includes a power supply, a main controller, a communication controller, a power supply controller, and the wireless charging and communication circuit according to any one of the embodiments of the present disclosure; and the communication controller and the power supply controller are both electrically connected to the wireless charging and communication circuit.

At least one embodiment of the present disclosure also provides a wireless charging and communication circuit system, which includes a receiving circuit, a signal processing circuit, and a transmitting circuit; the receiving circuit is configured to receive electric energy wirelessly transmitted by the transmitting circuit and wirelessly transmit a feedback signal to the transmitting circuit according to the electric energy; the signal processing circuit is configured to receive a control signal wirelessly transmitted by the transmitting circuit and process the control signal; and the transmitting circuit is configured to wirelessly transmit the electric energy to the receiving circuit, receive the feedback signal of the receiving circuit, and wirelessly transmit the control signal to the receiving circuit.

BRIEF DESCRIPTION OF THE DRAWINGS

In order to clearly illustrate the technical solutions of the embodiments of the disclosure, the drawings of the embodiments are briefly described in the following; it is obvious that the described drawings are only related to some embodiments of the disclosure and thus are not limitative to the disclosure.

DETAILED DESCRIPTION

Figure 1A:
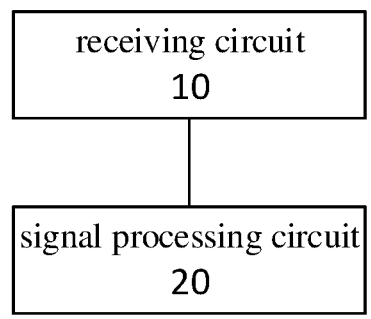
FIG. 1A is a structural schematic diagram of a wireless charging and communication circuit provided by some embodiments of the present disclosure.

Embodiments of the present disclosure are described in detail below, examples of the embodiments are illustrated in accompanying drawings, and the same or similar reference numerals refer to the same or similar elements or elements having the same or similar functions throughout. The embodiments described below with reference to the accompanying drawings are exemplary and are only for the purpose of explaining the present disclosure and should not be construed as limitation of the present disclosure.

Those skilled in the art can understand that the singular forms "a", "an" and "the" used herein may also include plural forms unless expressly stated. It should be further understood that the term "including" as used in the specification of the present disclosure refers to existence of the features, integers, steps, operations, elements, and/or components, but does not preclude existence of or adding one or more other features, integers, steps, operations, elements, components, and/or groups thereof. It should be understood that when an element is called to be "connected" or "coupled" to another element, it may be directly connected or coupled to the other element, or intervening elements may also be included. In addition, as used herein, "connected" or "coupled" may include a wireless connection or wireless coupling. As used herein, the phrase "and/or" includes all or any element and all combinations of one or more associated listed items.

Those skilled in the art can understand that unless otherwise defined, all terms (including technical terms and scientific terms) used herein have the same meanings as commonly understood by those of ordinary skill in the art to which the present disclosure belongs. It should also be understood that terms such as those defined in general dictionaries should be understood to have meanings consistent with those in the context of the prior art, and are not interpreted in idealized or overly formal meanings unless specifically defined as herein.

Those skilled in the art can understand that the terms "terminal" and "terminal equipment" used herein include not only equipment of a wireless signal receiver, which only has equipment of a wireless signal receiver without transmitting capability, but also equipment of receiving and transmitting hardware, which has equipment of receiving and transmitting hardware capable of carrying out bidirectional communication through a bidirectional communication link. The equipment may include: a cellular or other communication device, which has a single-line display or a multi-line display, or is without a multi-line display; a personal communications service (PCS), which can combine voice, data processing, fax and/or data communication capabilities; a personal digital assistant (PDA), which may include a radio frequency receiver, a pager, internet/intranet access, a web browser, a notepad, a calendar and/or a global positioning system (GPS) receiver; and conventional laptop and/or palmtop computers or other devices, which have and/or include radio frequency receivers. As used herein, the terms "terminal" and "terminal equipment" may be portable, transportable, installed in a vehicle (aviation, maritime and/or land), or adapted and/or configured to operate locally, and/or operate in a distributed form at any other locations on earth and/or in space. As used herein, the terms "terminal" and "terminal equipment" may also be communication terminals, internet terminals, music/video playing terminals, for example, a personal digital assistant (PDA), a mobile internet device (MID), and/or mobile phones with music/video playing function, or devices such as smart televisions and set-top boxes.

For a common passive electronic tag, it is usually impossible to perform communication while charging the passive electronic tag, so a current charging state cannot be known in time. In a few cases, that is, some passive electronic tags can perform communication while charging, but their circuit structure is very complex, and usually, only unidirectional communication can be realized, instead of bidirectional communication.

For example, a wireless charging circuit can be used to charge the passive electronic tag. A general wireless charging circuit is generally set up according to a Qi standard, which has poor compatibility for charging situations other than the Qi standard and has many inconveniences in actual application.

In view of the above problems, some embodiments of the present disclosure provide a wireless charging and communication circuit, a wireless electronic device, and a wireless charging and communication circuit system, which can solve the problems that communication cannot be carried out or only unidirectional communication can be carried out, and there is poor compatibility in different charging application scenarios, in a case where the passive electronic tag is charged wirelessly.

Some embodiments of the present disclosure have at least the following beneficial effects.

(1) A receiving circuit can be powered according to a charging instruction, and bidirectional data communication based on a transmitting circuit and the receiving circuit can be realized while charging, thereby not only facilitating to know the charging state at real-time, but also carrying out data transmission while charging.

(2) The circuit structure is simple, and good compatibility can be realized by the simple modification of parameter, which can be applied in charging scenes under Qi standard as well as non-standard charging scenes, thus improving the user's experience.

(3) In a case where the wireless charging and communication circuit is applied in an electronic tag having an electronic ink screen, due to the function based on bidirectional data communication, the wireless charging and communication circuit of the embodiments of the present disclosure can supply power only in a case where the electronic ink screen needs to refresh the screen, thereby saving energy.

The embodiments of the present disclosure are described in detail below with reference to the accompanying drawings.

In order to solve the problem that bidirectional communication cannot be realized while charging, some embodiments of the present disclosure provide a wireless charging and communication circuit, the structure of the wireless charging and communication circuit is illustrated in FIG. 1A, and the wireless charging and communication circuit includes a receiving circuit 10 and a signal processing circuit 20 electrically connected to each other. For example, the receiving circuit 10 is coupled to a separately provided transmitting circuit by a wireless signal, that is, the receiving circuit 10 can communicate with the separately provided transmitting circuit in a wireless way. The separately provided transmitting circuit may be coupled to the receiving circuit 10 of the wireless charging and communication circuit, for example.

The receiving circuit 10 and the signal processing circuit 20 may be disposed in a device to be charged, for example, an electronic tag having an electronic ink screen. For example, the electronic tag is a passive electronic tag. The receiving circuit 10 is used for receiving electric energy wirelessly transmitted by the transmitting circuit and wirelessly transmitting a feedback signal to the transmitting circuit according to the electric energy; and the signal processing circuit 20 is used for receiving a control signal wirelessly transmitted by the transmitting circuit and performing corresponding signal processing on the control signal, so that the control signal can be applied to a corresponding device to be charged. For example, the control signal may be generated by the transmitting circuit according to the received feedback signal, or may be generated according to other control instructions.

Figure 1B:
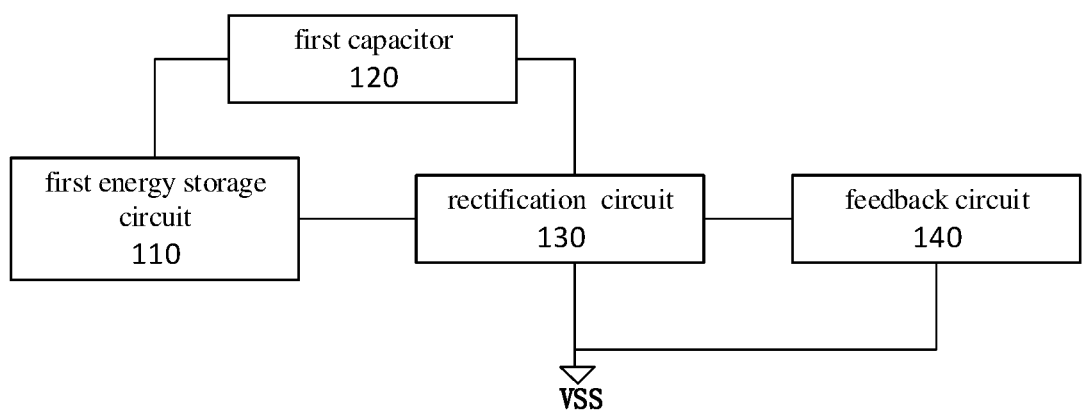
FIG. 1B is a schematic block diagram of a receiving circuit provided by some embodiments of the present disclosure.

Referring to FIG. 1B, in some embodiments, the receiving circuit 10 includes a first energy storage circuit 110, a first capacitor 120, a rectification circuit 130, and a feedback circuit 140.

For example, a first terminal of the first energy storage circuit 110 is electrically connected to a first terminal of the first capacitor 120, a second terminal of the first energy storage circuit 110 is electrically connected to a first terminal of the rectification circuit 130, and the first energy storage circuit 110 is configured to receive the electric energy wirelessly transmitted by the transmitting circuit.

A second terminal of the first capacitor 120 is electrically connected to a second terminal of the rectification circuit 130.

A third terminal of the rectification circuit 130 is electrically connected to a first voltage terminal VSS (e.g., grounded), and the rectification circuit 130 is configured to convert the electric energy into a direct-current voltage and output the direct-current voltage to the feedback circuit 140. For example, in the following description, the connection to the first voltage terminal VSS can be understood to be grounded, and being grounded can also be understood as the connection to the first voltage terminal VSS.

The feedback circuit 140 is electrically connected to the rectification circuit 130, and is configured to generate the feedback signal according to the direct-current voltage and transmit the feedback signal for feeding back the current charging state to the transmitting circuit through the first energy storage circuit 140. The specific feedback principle of the feedback circuit 140 is described in details in the following sections.

Figure 2:
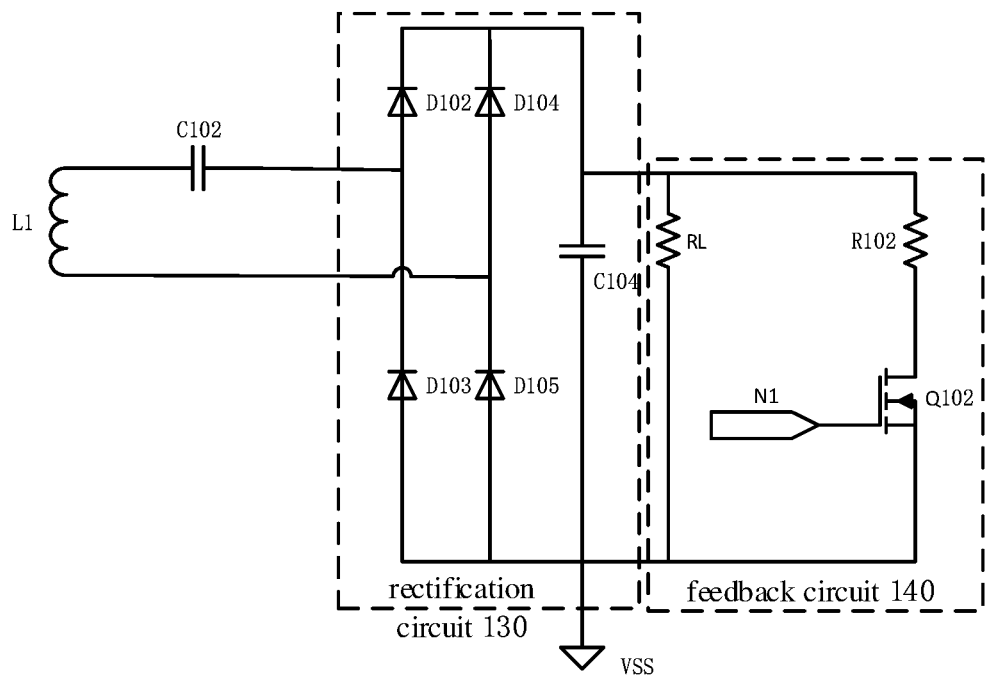
FIG. 2 is a schematic diagram of a circuit principle of a receiving circuit provided by some embodiments of the present disclosure.

By taking the circuit as illustrated in FIG. 2 as an example, the charging and discharging principle of the receiving circuit 10 in some embodiments of the present disclosure is further explained below.

In FIG. 2, the first energy storage circuit 110 may be implemented as an inductance coil L1 (hereinafter referred to as "a receiving inductor"), and the first capacitor 120 may be implemented as a capacitor C102; and the receiving inductor is coupled to a transmitting inductor in the separately provided transmitting circuit, thereby receiving the electric energy wirelessly transmitted by the transmitting inductor, and outputting the direct-current voltage through the rectification circuit 130 for the device to be charged.

Further, the feedback mode of the feedback circuit 140 includes two types: a resistance feedback mode and a capacitance feedback mode.

In a case where the feedback circuit 140 of some embodiments of the present disclosure adopts the resistance feedback mode, in some embodiments, the feedback circuit 140 includes a load modulation control terminal, a first switch sub-circuit, a load modulation resistor, and a load resistor.

The load modulation control terminal is electrically connected to a first terminal of the first switch sub-circuit; a second terminal of the first switch sub-circuit is electrically connected to a first terminal of the load modulation resistor, a third terminal of the first switch sub-circuit is electrically connected to the first voltage terminal VSS (e.g., grounded), and the first switch sub-circuit is configured to receive a load modulation signal, input from the load modulation control terminal, for modulating, and to be turned on or turned off according to the load modulation signal.

A first terminal of the load resistor is electrically connected to a second terminal of the load modulation resistor and the rectification circuit 130, and a second terminal of the load resistor is electrically connected to the first voltage terminal VSS (e.g., grounded); and the load modulation resistor and the load resistor are configured to modulate a resistance value of the feedback circuit 140, according to a turn-on state and a turn-off state of the first switch sub-circuit, to form the feedback signal.

By taking the circuit as illustrated in FIG. 2 as an example, the feedback principle of the feedback circuit 140 is further described below.

In FIG. 2, the first switch sub-circuit is a metal-oxide-semiconductor field-effect transistor (MOS transistor) Q102, and the first terminal of the first switch sub-circuit, the second terminal of the first switch sub-circuit and the third terminal of the first switch sub-circuit are respectively a gate electrode of the MOS transistor Q102, a drain electrode of the MOS transistor Q102, and a source electrode of the MOS transistor Q102. The load resistor is a resistor RL and the load modulation resistor is a resistor R102. The load modulation control terminal is N1. It should be noted that, in the embodiments of the present disclosure, the first switch sub-circuit is not limited to being implemented as the MOS transistor Q102, but may also be a thin film transistor or other devices having similar characteristics, and the embodiments of the present disclosure are not limited to this case.

In a case where the load modulation signal received by the gate electrode of the MOS transistor Q102 through the load modulation control terminal N1 is at a high level, the MOS transistor Q102 is turned on, so that the load modulation resistor R102 is connected in parallel with the load resistor RL, and an actual load resistance value of the receiving circuit 10 is a resistance value after the load modulation resistor R102 is connected in parallel with the load resistor RL; and in a case where the load modulation signal received by the gate electrode of the MOS transistor Q102 is at a low level, the MOS transistor Q102 is turned off (or off), and the actual load resistance value of the receiving circuit 10 is a resistance value of the load resistor RL.

It can be seen that in a case where the load modulation signal changes between a high level and a low level, the actual load resistance value of the receiving circuit 10 changes between two different resistance values, thus causing a voltage across the inductance coil L1 in the receiving circuit 10 to change. Because the inductance coil L1 of the receiving circuit 10 is coupled to the inductance coil of the transmitting circuit (i.e., the transmitting inductor), in a case where the voltage across the inductance coil L1 in the receiving circuit 10 changes, the voltage across the inductance coil of the transmitting circuit also changes. The change of the voltage across the transmitting inductor can cause a change of current of a detection element (e.g., a feedback detection resistor) in the transmitting circuit, and the feedback signal feeding back the change of the current is transmitted to a controller of the transmitting circuit from a load modulation feedback terminal in the transmitting circuit, thus completing the feedback process.

In order to better meet the actual needs of users, the resistance value of the load modulation resistor, the resistance value of the load resistor and resistance values of other resistors in some embodiments of the present disclosure can be set according to the actual needs, and the feedback circuit 140 can be simultaneously connected to a plurality of groups of first switch sub-circuits and load modulation resistors in parallel.

Figure 3:
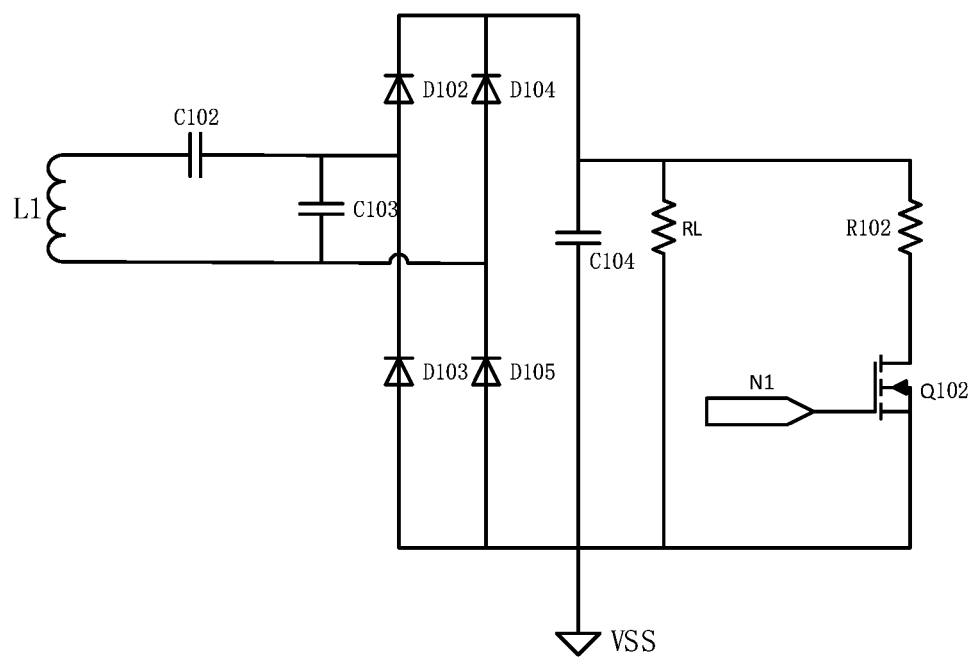
FIG. 3 is a schematic diagram of a circuit principle of another receiving circuit provided by some embodiments of the present disclosure.

The feedback circuit 140 as illustrated in FIG. 2 can be applied to various non-standard application scenarios and can meet personalized use requirements. In order to achieve compatibility with Qi standard and non-standards, while the feedback circuit 140 as illustrated in FIG. 2 is adopted, the receiving circuit 10 of some embodiments of the present disclosure is also electrically connected to a matching capacitor, such as a capacitor C103 as illustrated in FIG. 3.

In a case where the feedback circuit 140 of some embodiments of the present disclosure adopts the capacitance feedback mode, in some examples of some embodiments, the feedback circuit 140 includes a load modulation control terminal, a second switch sub-circuit, a load modulation capacitor, and a matching capacitor.

The load modulation control terminal is electrically connected to a first terminal of the second switch sub-circuit; and a second terminal of the second switch sub-circuit is electrically connected to a first terminal of the load modulation capacitor, and a third terminal of the second switch sub-circuit is electrically connected to the first voltage terminal VSS (e.g., grounded). The second switch sub-circuit is used for receiving the load modulation signal, which is input by the load modulation control terminal, for modulation, and is turned on or turned off according to the load modulation signal.

A first terminal of the matching capacitor is electrically connected to the second terminal of the first capacitor 120, and a second terminal of the matching capacitor is electrically connected to the second terminal of the first energy storage circuit 110.

Figure 4:
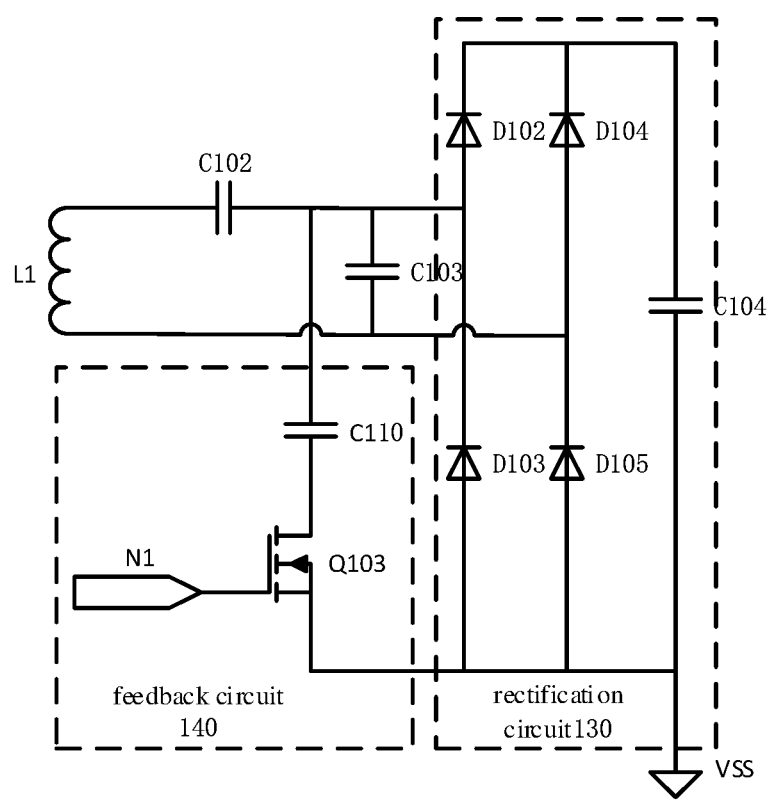
FIG. 4 is a schematic diagram of a circuit principle of still another receiving circuit provided by some embodiments of the present disclosure.

By taking the circuit as illustrated in FIG. 4 as an example, the feedback principle of the feedback circuit 140 described above is described below.

As illustrated in FIG. 4, the second switch sub-circuit is a MOS transistor Q103, and the first terminal of the second switch sub-circuit, the second terminal of the second switch sub-circuit, and the third terminal of the second switch sub-circuit are respectively a gate electrode of the MOS transistor Q103, a drain electrode of the MOS transistor Q103, and a source electrode of the MOS transistor Q103. The matching capacitor is a capacitor C103, and the load modulation capacitor is a capacitor C110. The load modulation control terminal is N1. It should be noted that, in the embodiments of the present disclosure, the second switch sub-circuit is not limited to being implemented as the MOS transistor Q103, but may also be a thin film transistor or other devices having similar characteristics, and the embodiments of the present disclosure are not limited to this case.

In a case where the load modulation signal received by the gate electrode of the MOS transistor Q103 through the load modulation control terminal N1 is at a high level, the MOS transistor Q103 is turned on, so that the load modulation capacitor C110 is connected in parallel with the matching capacitor C103, and an actual capacitance value of the receiving circuit 10 is a capacitance value after the load modulation capacitor C110 is connected in parallel with the matching capacitor C103; and in a case where the load modulation signal received by the gate electrode of the MOS transistor Q103 is at a low level, the MOS transistor Q103 is turned off, and the actual capacitance value of the receiving circuit 10 is a capacitance value of the matching capacitor C103.

It can be seen that in a case where the load modulation signal changes between a high level and a low level, the actual capacitance value of the receiving circuit 10 changes between two different capacitance values, thus causing the voltage across the inductance coil L1 in the receiving circuit 10 to change. Because the inductance coil L1 of the receiving circuit 10 is coupled to the inductance coil of the transmitting circuit (i.e., the transmitting inductor), in a case where the voltage across the inductance coil L1 in the receiving circuit 10 changes, the voltage across the inductance coil of the transmitting circuit also changes. The change of the voltage across the transmitting inductor can cause a change of current of the detection element (e.g., the feedback detection resistor) in the transmitting circuit, and the feedback signal feeding back the change of the current is transmitted to the controller of the transmitting circuit by the load modulation feedback terminal in the transmitting circuit, thus completing the feedback process.

In order to better meet the actual needs of the users, the capacitance value of the load modulation capacitor, the capacitance value of the matching capacitor and capacitance values of other capacitors in some embodiments of the present disclosure can be set according to the actual needs, and the feedback circuit 140 can be simultaneously connected to a plurality of groups of second switch sub-circuits and load modulation capacitors in parallel.

In other embodiments, the feedback circuit 140 includes a load modulation control terminal, a first switch sub-circuit, a load modulation capacitor, and a load resistor, i.e., the load modulation capacitor replaces the load modulation resistor R102 as illustrated in FIG. 2 or FIG. 3. The connection relationship and feedback principle of the feedback circuit 140 are similar to those as illustrated in FIG. 2 or FIG. 3, and are not described here again.

In other embodiments, a sixth switch sub-circuit, such as a MOS transistor, may be connected to a branch where the matching capacitor is located, and the turn-on and turn-off of the circuit, to which the matching capacitor belongs, may be controlled by the load modulation signal received by the sixth switch sub-circuit. For example, in a case where the load modulation signal is at a high level, the circuit is turned on, and in a case where the load modulation signal is at a low level, the circuit is turned off, so that the capacitance value of the receiving circuit 10 changes with the change of the load modulation signal, and the voltage across the inductance coil L1 changes accordingly, and further the feedback detection resistance of the transmitting circuit changes caused by the transmitting inductor in the transmitting circuit.

For example, the rectification circuit 130 in some embodiments of the present disclosure includes a first rectification sub-circuit (a diode D102 as illustrated in FIG. 2), a second rectification sub-circuit (a diode D103 as illustrated in FIG. 2), a third rectification sub-circuit (a diode D104 as illustrated in FIG. 2), a fourth rectification sub-circuit (a diode D105 as illustrated in FIG. 2), and a sixth capacitor (a capacitor C104 as illustrated in FIG. 2), the connection relationship of which is illustrated in FIG. 2.

In some embodiments, the signal processing circuit 20 includes a decoding circuit electrically connected to the receiving circuit 10, and is configured to receive the control signal generated, for example, according to the feedback signal, and transmitted by the transmitting circuit, and decode the control signal. Further, the signal processing circuit 20 of some embodiments of the present disclosure includes a decoding circuit as illustrated in FIG. 5 or FIG. 6.

Figure 5:
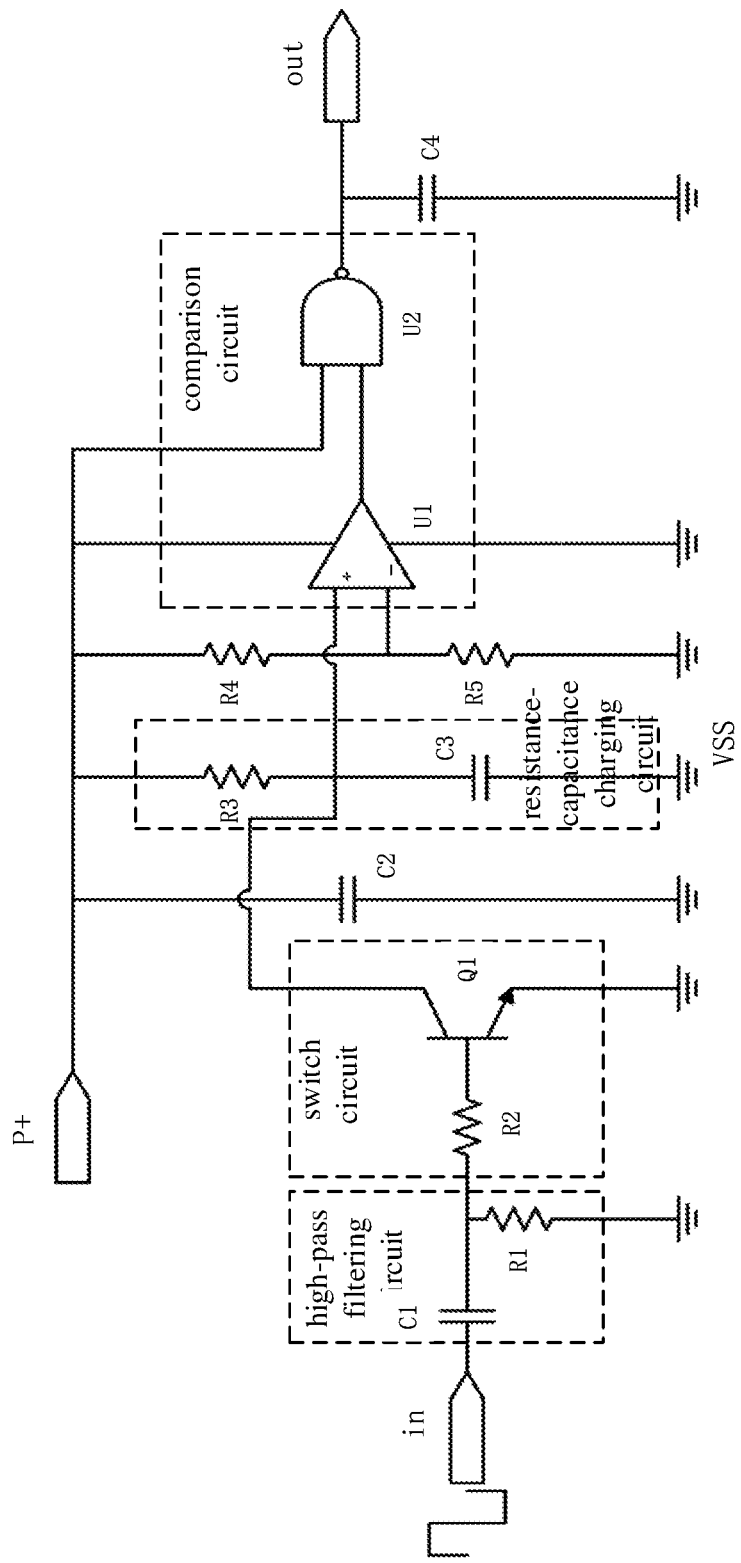
FIG. 5 is a schematic diagram of a circuit principle of a decoding circuit provided by some embodiments of the present disclosure.
Figure 6:
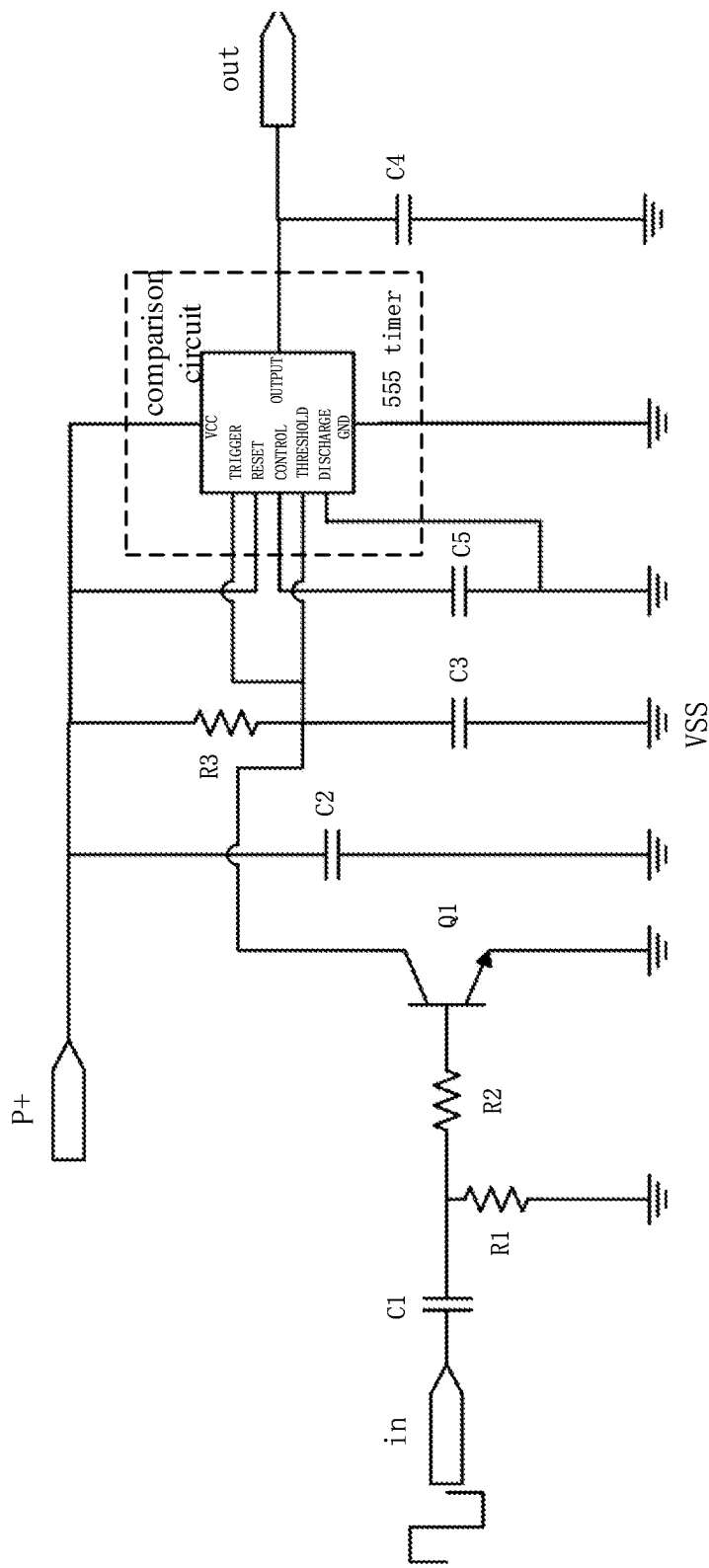
FIG. 6 is a schematic diagram of a circuit principle of another decoding circuit provided by some embodiments of the present disclosure.

For example, as illustrated in FIG. 5 or FIG. 6, the decoding circuit described above includes a first signal input terminal in, a second signal input terminal P+, a high-pass filtering circuit, a switch circuit, a third capacitor, a resistance-capacitance charging circuit (or referred to as a RC charging circuit), a comparison circuit, a fourth capacitor, and a signal output terminal out.

The first signal input terminal in and the second signal input terminal P+ are both electrically connected to the receiving circuit 10, for example, connected to the inductance coil L1 of the receiving circuit 10. For example, in some embodiments, the first signal input terminal in and the second signal output terminal P+ are electrically connected to different terminals of the inductance coil L1. For example, in other embodiments, the first signal input terminal in is electrically connected to the second terminal of the first capacitor C102, the first signal input terminal in is used for receiving the control signal transmitted by the transmitting circuit, and the second signal output terminal P+ is electrically connected to the second terminal of the inductance coil L1.

A first terminal of the high-pass filtering circuit is electrically connected to the first signal input terminal in, a second terminal of the high-pass filtering circuit is electrically connected to a first terminal of the switch circuit, and the high-pass filtering circuit is used for filtering the control signal received by the first signal input terminal in to prevent a direct-current voltage from affecting the switch circuit. Further, the high-pass filtering circuit includes a sixth capacitor (a capacitor C1 as illustrated in FIG. 5 or FIG. 6) and a first resistor (a resistor R1 as illustrated in FIG. 5 or FIG. 6), a first terminal of the capacitor C1 is electrically connected to the first signal input terminal in, a second terminal of the capacitor C1 is electrically connected to a first terminal of the resistor R1 and the first terminal of the switch circuit, and a second terminal of the resistor R1 is grounded.

A second terminal of the switch circuit is electrically connected to the comparison circuit, and a third terminal of the switch circuit is grounded, and the switch circuit is turned on or turned off according to different signals that are received, thereby controlling a charging state and a discharging state of the resistance-capacitance charging circuit. Further, the switch circuit includes a current limiting resistor R2 and a transistor Q1, a first terminal of the current limiting resistor R2 is electrically connected to a second terminal of the capacitor C1, a second terminal of the current limiting resistor R2 is electrically connected to a base electrode of the transistor Q1, a collecting electrode of the transistor Q1 is electrically connected to the resistance-capacitance charging circuit and the comparison circuit, and a emitting electrode of the transistor Q1 is grounded.

The third capacitor is, for example, a capacitor C2 as illustrated in FIG. 5 or FIG. 6. A first terminal of the capacitor C2 is electrically connected to the second signal input terminal P+, and a second terminal of the capacitor C2 is grounded.

A first terminal of the resistance-capacitance charging circuit is electrically connected to the second signal input terminal P+, a second terminal of the resistance-capacitance charging circuit is grounded, a third terminal of the resistance-capacitance charging circuit is electrically connected to the collecting electrode of the transistor Q1, and the resistance-capacitance charging circuit can discharge through the transistor Q1. Further, the circuit principle of the resistance-capacitance charging circuit may be referred to FIG. 5, including a resistor R3 and a capacitor C3; and a first terminal of the resistor R3 is electrically connected to the second signal input terminal P+, a second terminal of the resistor R3 is electrically connected to a first terminal of the capacitor C3, the collecting electrode of the transistor Q1, and the comparison circuit, and a second terminal of the capacitor C3 is grounded.

The comparison circuit is electrically connected to the resistance-capacitance charging circuit, the second signal input terminal P+, the collecting electrode of the transistor Q1 and the signal output terminal out, and is also grounded. A first terminal of the fourth capacitor is electrically connected to the signal output terminal out, and a second terminal of the fourth capacitor is grounded, for example.

For example, the comparison circuits in some embodiments of the present disclosure may compare the input signals that are received and output decoded signals.

Referring to FIG. 5, in some embodiments, the comparison circuit includes a comparator U1 and a logic inversion circuit U2, which can complete decoding of signals according to an amplitude modulation method. The logic inversion circuit U2 may be a NAND gate, an inverter or the like, to realize the function of inverting the signal. For example, the comparator U1 and the logic inversion circuit U2 may be independent chips or circuits, or they may be implemented by comparators and NAND gates inside a microcontroller unit (MCU), and the decoding of signals is completed by software logic.

The decoding circuit also includes a resistance voltage division circuit. The resistance voltage division circuit comprises a first voltage division resistor R4 and a second voltage division resistor R5 which are electrically connected, and a specific resistance value of R4 and a specific resistance value of R5 can be set according to actual requirements, or other voltage division resistors can be added. A first terminal of the first voltage division resistor R4 is electrically connected to the second signal input terminal P+, and a second terminal of the first voltage division resistor R4 is electrically connected to a first terminal of the second voltage division resistor R5 and an inverting terminal of the comparator U1. A second terminal of the second voltage division resistor R2 is grounded.

A non-inverting terminal of the comparator U1 is electrically connected to the second terminal of the switch circuit, for example, to the collecting electrode of the transistor Q1. The inverting terminal of the comparator U1 is electrically connected to the resistance voltage division circuit, for example, connected to the second terminal of the first voltage division resistor R4. A first power supply terminal of the comparator U1 is electrically connected to the second signal input terminal P+, a second power supply terminal of the comparator U1 is grounded, for example, and an output terminal of the comparator U1 is electrically connected to a first input terminal of the logic inversion circuit U2. A second input terminal of the logic inversion circuit U2 is electrically connected to the second signal input terminal P+, and an output terminal of the logic inversion circuit U2 is electrically connected to the signal output terminal out; and a first terminal of the resistance voltage division circuit is electrically connected to the second signal input terminal P+, and a second terminal of the resistance voltage division circuit is grounded.

By taking the circuit as illustrated in FIG. 5 as an example, the operation principle of the comparison circuit is further described below.

The base electrode of transistor Q1 receives a control signal input through the first signal input terminal in and filtered by the high-pass filtering circuit, and the transistor Q1 switches between a turn-on state and a turn-off state according to a frequency of the control signal; and in a case where the transistor Q1 is turned on or turned off, the resistance-capacitance charging circuit (i.e., RC charging circuit) is in a discharging state or a charging state respectively. The voltages across the capacitor C3 are different in different states, so the voltages received by the non-inverting terminal of the comparator U1 electrically connected to the capacitor C3 are different. For example, by reasonably setting the resistance value of the resistor R4 and the resistance value of the resistor R5, the voltage at the inverting terminal of the comparator U1 is kept at a certain voltage value (i.e., a setting threshold). Because the voltage received by the non-inverting terminal of the comparator U1 changes with the turn-on or turn-off of the transistor Q1, the voltage output at the output terminal of the comparator U1 also changes accordingly. Furthermore, the output voltage of the logic inversion circuit U2 is correspondingly different according to the difference of the output voltage of the comparator U1.

For example, the comparator U1 compares the voltage received at the non-inverting terminal of the comparator U1 with the setting threshold. In a case where the voltage received at the non-inverting terminal is higher than or equal to the setting threshold, the output terminal of the comparator U1 outputs a low-level signal to the logic inversion circuit U2. In a case where the voltage received at the non-inverting terminal is lower than the setting threshold, the output terminal of the comparator U1 outputs a low-level signal to the logic inversion circuit U2. For example, the setting threshold is set as the voltage value at the inverting terminal of the comparator U1. The specific value is not limited to this value and can be determined according to actual requirements. The setting threshold can be obtained by setting the resistance value of the resistor R4 and the resistance value of the resistor R5 to divide the voltages.

The first input terminal of the logic inversion circuit U2 receives a high-level signal input by the second signal input terminal P+, and controls the signal of the output terminal of the logic inversion circuit U2 to be output according to the signal received by the second input terminal of the logic inversion circuit U2; and in a case where the second input terminal of the logic inversion circuit U2 receives a high-level signal transmitted by the comparator U1, the output terminal of the logic inversion circuit U2 outputs a low-level signal, and in a case where the second input terminal of the logic inversion circuit U2 receives a low-level signal transmitted by the comparator U1, the output terminal of the logic inversion circuit U2 outputs a high-level signal. In this way, the inversion of the signal can be realized, and the decoded signal is output through the signal output terminal out.

Referring to FIG. 6, in other embodiments, the comparison circuit includes a trigger circuit (or called as a 555 timer), and the decoding circuit further includes a fifth capacitor (e.g., a capacitor C5). The trigger circuit is used to replace the comparator U1 and the logic inversion circuit U2 as illustrated in FIG. 5, which can improve the integration level of the circuit.

A first trigger terminal (i.e., a low trigger terminal or a TR terminal, i.e., a TRIGGER terminal as illustrated in FIG. 6) and a second trigger terminal (i.e., a high trigger terminal or a TH terminal, i.e., a THRESHOLD terminal as illustrated in FIG. 6) of the 555 timer are both electrically connected to the second terminal of the switch circuit. For example, the TR terminal and the TH terminal are both electrically connected to the collecting electrode of the transistor Q1 for receiving the control signal amplified by the switch circuit.

A power supply terminal (a VCC terminal as illustrated in FIG. 6) and a reset terminal (a RESET terminal as illustrated in FIG. 6) of the 555 timer are both electrically connected to the second signal input terminal P+; and the power supply terminal of the 555 timer receives a high-level signal of the second signal input terminal P+.

A control terminal of the 555 timer (i.e., a CONTROL terminal as illustrated in FIG. 6) is electrically connected to a first terminal of the fifth capacitor C5, and a second terminal of the fifth capacitor C5 is grounded. A discharge terminal (i.e., a DISCHARGE terminal as illustrated in FIG. 6) and a ground terminal (i.e., a GND terminal as illustrated in FIG. 6) of the 555 timer are both grounded.

An output terminal of the 555 timer (i.e., an OUTPUT terminal as illustrated in FIG. 6) is electrically connected to the signal output terminal out for outputting a decoded low-level pulse signal.

By taking the circuit as illustrated in FIG. 6 as an example, the operation principle of the comparison circuit is described as follows.

The base electrode of the transistor Q1 receives the control signal input through the first signal input terminal in and filtered by the high-pass filtering circuit, and the transistor Q1 switches between a turn-on state and a turn-off state according to the frequency of the control signal; and the 555 timer and the RC charging circuit form a Schmitt trigger. The RC charging circuit includes the resistor R3 and the capacitor C3, both of which are electrically connected to the transistor Q1, and the capacitor C3 is also electrically connected to the TR terminal and the TH terminal of the 555 timer (for detailed electrical connection relationship, the foregoing content or FIG. 6 can be referred to).

In a case where the transistor Q1 is turned on or turned off at a certain switch frequency, the RC charging circuit switches between the discharging state and the charging state at the same frequency. The voltages across the capacitor C3 are different in different states, and the voltages received by the TR terminal and the TH terminal, electrically connected to the capacitor C3, of the 555 timer, are different, so the voltages output from the output terminal OUTPUT of the 555 timer are also different.

For example, in a case where the RC charging circuit is in the discharging state, the discharging speed of the capacitor C3 is faster, so the voltage across the capacitor C3 drops faster in a short time. Further, in a case where the switch frequency of the transistor Q1 is greater than the setting threshold, because the discharging frequency of the capacitor C3 is higher and the discharging speed is faster, the two terminals of the capacitor C3 are kept at a lower voltage, and the voltages received by the TR terminal and the TH terminal of the 555 timer are correspondingly lower, thus the logic leaping voltage cannot be reached. At this time, the output terminal OUTPUT of the 555 timer outputs a high-level signal.

In a case where the switch frequency of the transistor Q1 is not greater than the above-mentioned setting threshold, because the discharging frequency of the capacitor C3 is relatively low, the two terminals of the capacitor C3 can reach and maintain a higher voltage. Correspondingly, the voltages received by the TR terminal and the TH terminal of the 555 timer can reach the logic leaping voltage. At this time, the output terminal OUTPUT of the 555 timer outputs a low-level signal.

The 555 timer reverses the signal in the above-mentioned way, and then outputs the decoded signal through the signal output terminal out.

Some embodiments of the present disclosure also provide a wireless charging and communication circuit, which includes a transmitting circuit.

The transmitting circuit is wirelessly coupled to a receiving circuit which is separately provided.

The transmitting circuit can be arranged in various charging devices such as fixed terminals or handheld terminals, and is used for wirelessly transmitting electric energy to the receiving circuit which is separately provided, receiving a feedback signal transmitted by the receiving circuit, and wirelessly transmitting a control signal generated according to the feedback signal, for example, to the receiving circuit.

In a case where the wireless charging and communication circuit provided by some embodiments of the present disclosure is applied in a charging system of the electronic tag, power is supplied to the electronic tag upon receiving a screen refresh instruction, and the electronic ink screen in the electronic tag is controlled to refresh the screen by using the control signal; and in a case where the wireless charging and communication circuit provided by some embodiments of the present disclosure is applied in other scenes, the transmission of the control signal can realize corresponding data communication in an usage scene.

Figure 7A:
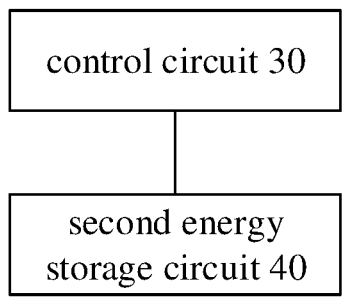
FIG. 7A is a structural schematic diagram of another wireless charging and communication circuit provided by some embodiments of the present disclosure.

Referring to FIG. 7A, in some embodiments, the transmitting circuit includes a control circuit 30 and a second energy storage circuit 40 electrically connected to each other. For example, the control circuit 30 is also electrically connected to a power supply other than the wireless charging and communication circuit of some embodiments of the present disclosure for transmitting the electric energy of the power supply to the second energy storage circuit 40, and the second energy storage circuit 40 is used for storing the electric energy and wirelessly transmitting the electric energy to the receiving circuit which is separated provided.

Figure 7B:
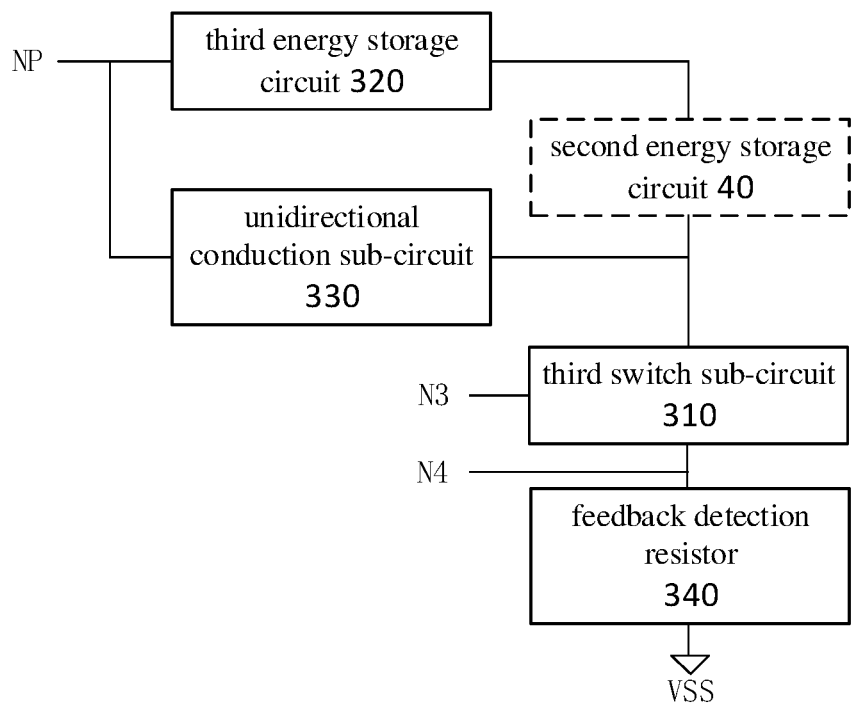
FIG. 7B is a schematic block diagram of a control circuit provided by some embodiments of the present disclosure.

For example, the control circuit 30 in some embodiments of the present disclosure includes a third switch sub-circuit 310, a third signal input terminal N3, a third energy storage circuit 320, a unidirectional conduction sub-circuit 330, a feedback detection resistor 340, a load modulation feedback terminal N4, and a power input terminal NP, and the schematic block diagram of the control circuit 30 is illustrated in FIG. 7B.

A first terminal of the third switch sub-circuit 310 is electrically connected to a second terminal of the second energy storage circuit 40, a second terminal of the third switch sub-circuit 310 is electrically connected to a first terminal of the feedback detection resistor 340 and the load modulation feedback terminal N4, a third terminal of the third switch sub-circuit 310 is electrically connected to the third signal input terminal N3, and the third switch sub-circuit 310 is configured to be turned on or turned off, according to a charging control signal input by the third signal input terminal N3, to control a turn-on/turn-off state of the circuit to which the third switch sub-circuit 310 belongs.

A first terminal of the third energy storage circuit 320 is also electrically connected to the power input terminal NP to receive the electric energy from a separately provided power supply. A second terminal of the third energy storage circuit 320 is electrically connected to a first terminal of the second energy storage circuit 40. The third energy storage circuit 320 is used to transmit the electric energy of the power supply to the second energy storage circuit 40 in a case where the charging control signal input by the third signal input terminal N3 is at a high level, and to store the electric energy released by the second energy storage circuit 40 in a case where the charging control signal is at a low level.

A first terminal of the unidirectional conduction sub-circuit 330 is electrically connected to the second terminal of the second energy storage circuit 40, and a second terminal of the unidirectional conduction sub-circuit 330 is electrically connected to the first terminal of the third energy storage circuit 320. In a case where the charging control signal is at a low level, the second energy storage circuit 40 releases electric energy, and the unidirectional conduction sub-circuit 330 enables the current to only flow from the first terminal of the unidirectional conduction sub-circuit 330 to the second terminal of the unidirectional conduction sub-circuit 330.

A first terminal of the feedback detection resistor 340 is electrically connected to the load modulation feedback terminal N4, and a second terminal of the feedback detection resistor 340 is connected to the first voltage terminal VSS (e.g., grounded), the feedback detection resistor 340 is used for detecting a feedback signal transmitted by the receiving circuit which is separately provided, and the specific principle of the feedback detection resistor 340 is described in detail in followings.

Figure 8:
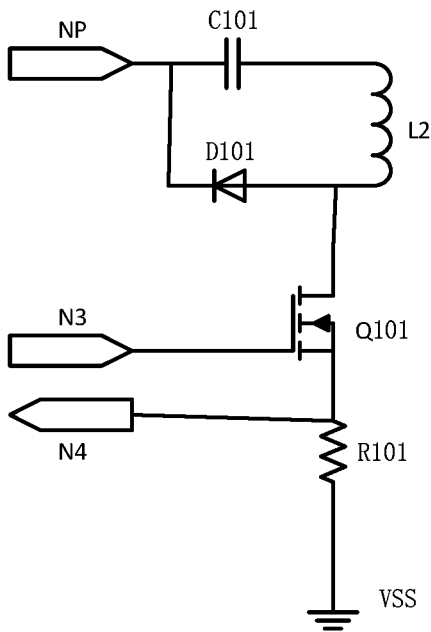
FIG. 8 is a schematic diagram of a circuit principle of a transmitting circuit provided by some embodiments of the present disclosure.

By taking the circuit as illustrated in FIG. 8 as an example, the charging and discharging operation principle of the transmitting circuit in some embodiments of the present disclosure is further described.

In FIG. 8, the second energy storage circuit 40 is an inductance coil L2 (referred to as a "transmitting inductor" below), the third energy storage circuit 320 is a capacitor C101, and the feedback detection resistor 340 is a resistor R101. The third switch sub-circuit 310 is a MOS transistor Q101. At this time, the first terminal of the third switch sub-circuit 310, the second terminal of the third switch sub-circuit 310, and the third terminal of the third switch sub-circuit 310 are respectively a drain electrode of the MOS transistor Q101, a source electrode of the MOS transistor Q101, and a gate electrode of the MOS transistor Q101. The unidirectional conduction sub-circuit 330 is a diode D101, and in this case, the first terminal of the unidirectional conduction sub-circuit 330 and the second terminal of the unidirectional conduction sub-circuit 330 are an anode of the diode D101 and a cathode of the diode D101, respectively.

The charging control signal input from the third signal input terminal N3 is usually a pulse signal converted at a certain frequency, such as a pulse width modulation (PWM) signal. In a case where the charging control signal is at a high level, the MOS transistor Q101 is turned on, and the circuit to which the MOS transistor Q101 belongs is also turned on. The power supply connected to the control circuit 30 charges the transmitting inductor L2 through the capacitor C101. In a case where the charging control signal is at a low level, the MOS transistor Q101 is turned off, and the circuit to which the MOS transistor Q101 belongs is turned off. The transmitting inductor L2, the diode D101, and the capacitor C101 form a discharge loop, and the transmitting inductor L2 releases the electric energy through the discharge loop.

Figure 9A:
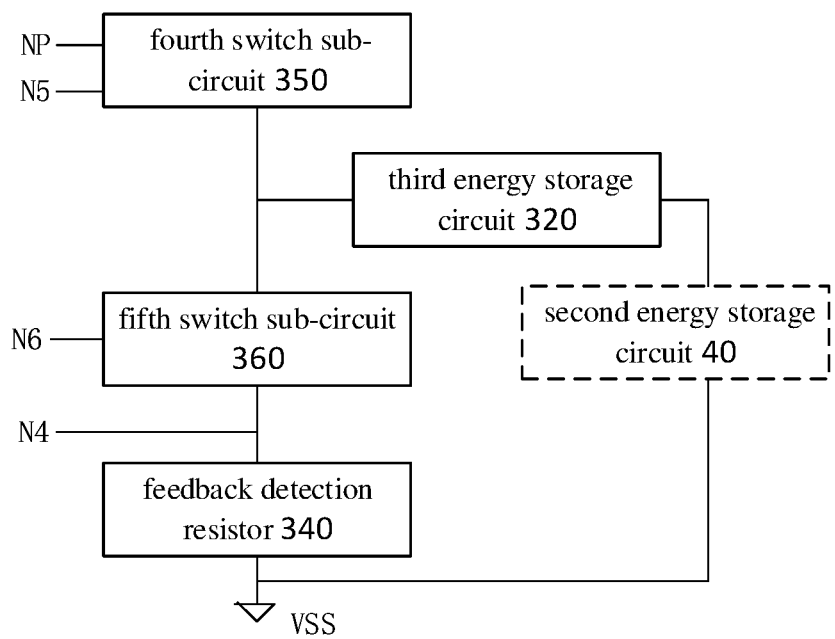
FIG. 9A is a schematic block diagram of another control circuit provided by some embodiments of the present disclosure.

For example, in other embodiments, the control circuit 30 includes a fourth switch sub-circuit 350, a fourth signal input terminal N5, a fifth switch sub-circuit 360, a fifth signal input terminal N6, a third energy storage circuit 320, a feedback detection resistor 340, a load modulation feedback terminal N4, and a power input terminal NP, and the schematic block diagram of the control circuit 30 is illustrated in FIG. 9A.

A first terminal of the fourth switch sub-circuit 350 is electrically connected to the power input terminal NP to receive the electric energy provided by the power supply which is separately provided, a second terminal of the fourth switch sub-circuit 350 is electrically connected to a first terminal of the third energy storage circuit 320, a third terminal of the fourth switch sub-circuit 350 is electrically connected to the fourth signal input terminal N5, and the fourth switch sub-circuit 350 is configured to be turned on or turned off according to a first charging control signal input by the fourth signal input terminal N5. For example, the fourth switch sub-circuit 350 is turned on in a case where the first charging control signal is at a high level and is turned off in a case where the first charging control signal is at a low level.

A first terminal of the fifth switch sub-circuit 360 is electrically connected to the second terminal of the fourth switch sub-circuit 350, a second terminal of the fifth switch sub-circuit 360 is electrically connected to a first terminal of the feedback detection resistor 340, a third terminal of the fifth switch sub-circuit 360 is electrically connected to the fifth signal input terminal N6, and the fifth switch sub-circuit 360 is configured to be turned on or turned off according to a second charging control signal input by the fifth signal input terminal N6, to control the circuit, to which the fifth switch sub-circuit 360 belongs, to be turned on or turned off. For example, the fifth switch sub-circuit 360 is turned on in a case where the second charging control signal is at a high level and is turned off in a case where the second charging control signal is at a low level.

The first terminal of the feedback detection resistor 340 is electrically connected to the load modulation feedback terminal N4, a second terminal of the feedback detection resistor 340 is electrically connected to the first voltage terminal VSS (for example, grounded), and the feedback detection resistor 340 is configured to respond to the feedback signal transmitted by the receiving circuit and output the feedback signal through the load modulation feedback terminal N4. The specific principle of the feedback detection resistor 340 is described in details in followings.

A second terminal of the third energy storage circuit 320 is connected to a first terminal of the second energy storage circuit 40, and a second terminal of the second energy storage circuit 40 is connected to the first voltage terminal VSS (e.g., grounded).

Figure 9B:
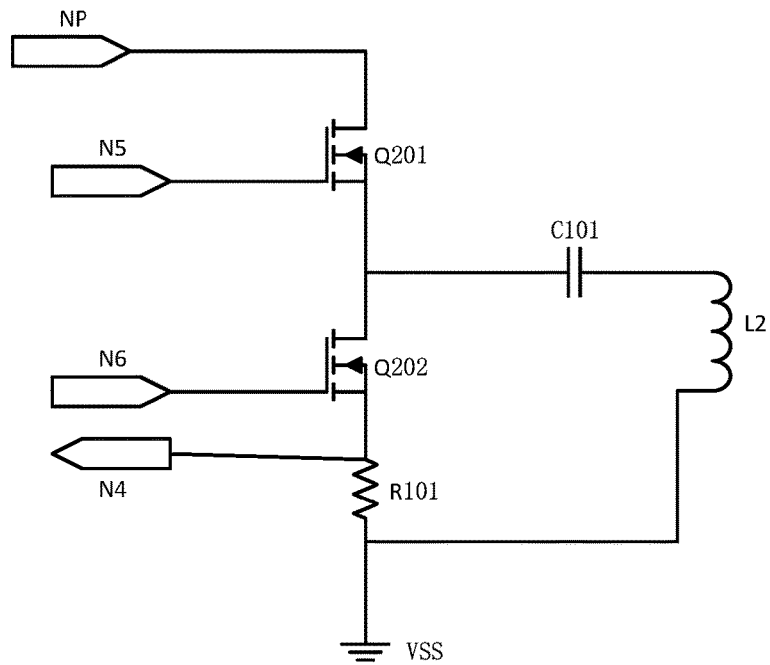
FIG. 9B is a schematic diagram of a circuit principle of another transmitting circuit provided by some embodiments of the present disclosure.

By taking the circuit as illustrated in FIG. 9B as an example, the charging and discharging operation principle of the transmitting circuit in some embodiments of the present disclosure is further described below.

In FIG. 9B, the second energy storage circuit 40 is an inductance coil L2 (referred to as a "transmitting inductor" below), the third energy storage circuit 320 is a capacitor C101, and the feedback detection resistor 340 is a resistor R101. The fourth switch sub-circuit 350 is a first field-effect transistor (e.g., a MOS transistor Q201), and the first terminal of the fourth switch sub-circuit 350, the second terminal of the fourth switch sub-circuit 350, and the third terminal of the fourth switch sub-circuit 350 are respectively a drain electrode of the MOS transistor Q201, a source electrode of the MOS transistor Q201, and a gate electrode of the MOS transistor Q201. The fifth switch sub-circuit 360 is a second field-effect transistor (e.g., a MOS transistor Q202), and the first terminal of the fifth switch sub-circuit 360, the second terminal of the fifth switch sub-circuit 360, and the third terminal of the fifth switch sub-circuit 360 are respectively a drain electrode of the MOS transistor Q202, a source electrode of the MOS transistor Q202, and a gate electrode of the MOS transistor Q202.

The first charging control signal input from the fourth signal input terminal N5 and the second charging control signal input from the fifth signal input terminal N6 are usually pulse signals converted at a certain frequency, such as pulse width modulation (PWM) signals.

In a case where the first charging control signal is at a high level and the second charging control signal is at a low level, the MOS transistor Q201 is turned on, and the circuit to which the MOS transistor Q201 belongs is also turned on, the MOS transistor Q202 is turned off, and the power supply connected to the control circuit 30 charges the transmitting inductor L2 through the capacitor C101.

In a case where the first charging control signal is at a low level and the second charging control signal is at a high level, the MOS transistor Q201 is turned off, the circuit to which the MOS transistor Q201 belongs is turned off, the MOS transistor Q202 is turned on, the transmitting inductor L2, the MOS transistor Q202 and the capacitor C101 form a discharge loop, and the transmitting inductor L2 releases the electric energy through the discharge loop.

Figure 10:
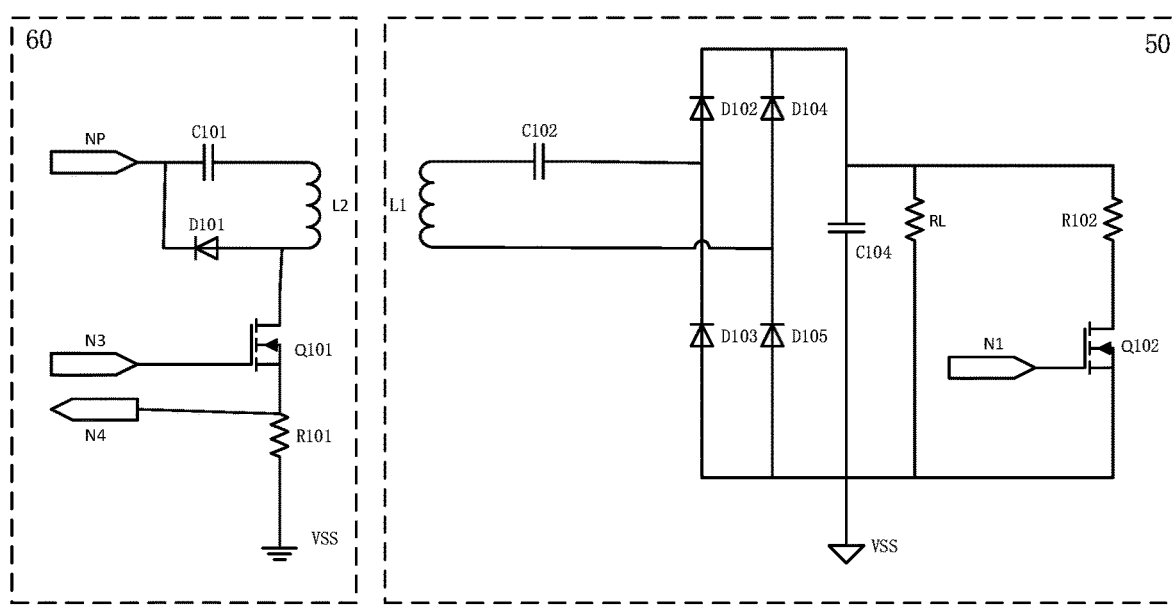
FIG. 10 is a schematic diagram of a circuit principle of yet another wireless charging and communication circuit provided by some embodiments of the present disclosure.

It should be noted that the wireless charging and communication circuit including the receiving inductor L1 and the wireless charging and communication circuit including the transmitting inductor L2 can work together, and the receiving inductor L1 and the transmitting inductor L2 are coupled to each other to wirelessly transmit the electric energy. For example, the circuit as illustrated in FIG. 2 can cooperate with the circuit as illustrated in FIG. 8. As illustrated in FIG. 10, the receiving inductor L1 in the wireless charging and communication circuit 50 and the transmitting inductor L2 in the wireless charging and communication circuit 60 are coupled to each other. In a case where the circuit as illustrated in FIG. 10 is applied in a charging system of an electronic tag, the wireless charging and communication circuit 50 can be disposed in the electronic tag, and the wireless charging and communication circuit 60 can be disposed in a charging device such as a fixed terminal or a handheld terminal. For example, the signal processing circuit (i.e., the decoding circuit) as illustrated in FIG. 5 or FIG. 6 may also be deposed in the electronic tag, and the decoding circuit may be electrically connected to the first capacitor C102 according to the connection mode described above, thereby realizing the signal decoding function. The wireless charging and communication circuit 50 may also generate a feedback signal and transmit the feedback signal to the wireless charging and communication circuit 60 through an inductive coupling function to realize a signal feedback function. In this way, the wireless charging and communication circuit 50 and the wireless charging and communication circuit 60 can realize bidirectional data communication while transmitting the electric energy.

Some embodiments of the present disclosure also provide a wireless charging and communication circuit system, which includes a receiving circuit, a signal processing circuit, and a transmitting circuit. The receiving circuit is configured to receive electric energy wirelessly transmitted by the transmitting circuit and wirelessly transmit a feedback signal to the transmitting circuit according to the electric energy. The signal processing circuit is configured to receive a control signal wirelessly transmitted by the transmitting circuit and process the control signal. The transmitting circuit is configured to wirelessly transmit the electric energy to the receiving circuit, receive the feedback signal of the receiving circuit, and wirelessly transmit the control signal to the receiving circuit. For example, in some examples, the wireless charging and communication circuit system is a combination of the circuit as illustrated in FIG. 10 and the circuit as illustrated in FIG. 5 or in FIG. 6. The working principle of the wireless charging and communication circuit system can be referred to the foregoing content and is not described here again.

Based on the above embodiments, the wireless charging and communication circuit provided by some embodiments of the present disclosure has at least the following beneficial effects.

(1) A receiving circuit can be powered according to a charging instruction, and bidirectional data communication based on a transmitting circuit and the receiving circuit can be realized while charging, thus facilitating to knowing the charging state at real-time.

(2) The circuit structure is simple, and good compatibility can be realized through the simple parameter modification, which can be applied in charging scenes under Qi standard as well as non-standard charging scenes, thus improving the user's experience.

(3) In a case where the wireless charging and communication circuit is applied in an electronic tag having an electronic ink screen, based on the function of bidirectional data communication, the wireless charging and communication circuit of the embodiments of the present disclosure can only supply power in a case where the electronic ink screen needs to refresh the screen, thereby saving energy.

Some embodiments of the present disclosure also provide a wireless electronic device, which includes a main controller, a communication controller, a power receiving controller, and the wireless charging and communication circuit provided by any one of the embodiments of the present disclosure.

Figure 11:
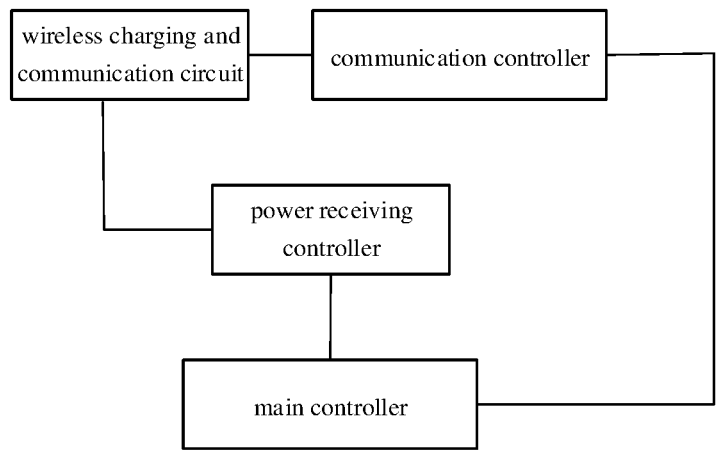
FIG. 11 is a schematic block diagram of a wireless electronic device provided by some embodiments of the present disclosure.

As illustrated in FIG. 11, the power receiving controller and the communication controller are both electrically connected to the wireless charging and communication circuit; and the main controller is electrically connected to the communication controller and the power receiving controller. For example, the wireless charging and communication circuit includes a receiving inductor L1. For example, the main controller, the communication controller and the power receiving controller cooperate with each other to control the wireless charging and communication circuit, for example, to provide the aforementioned signals to the wireless charging and communication circuit, and to collect signals generated by the wireless charging and communication circuit.

Figure 12:
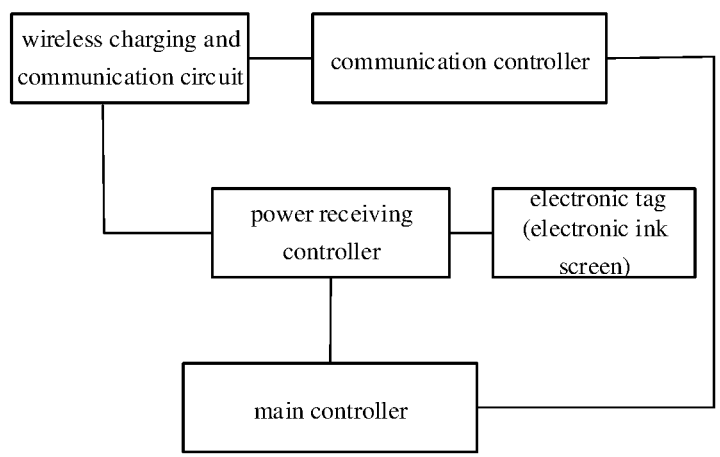
FIG. 12 is a schematic block diagram of another wireless electronic device provided by some embodiments of the present disclosure.

For example, in some embodiments, as illustrated in FIG. 12, the wireless electronic device further includes an electronic tag electrically connected to the power receiving controller. The electronic tag includes, for example, an electronic ink screen, and the electronic ink screen is electrically connected to the power receiving controller and configured be supplied with power by the power receiving controller. It should be noted that the main controller, the communication controller and the power receiving controller can be dedicated or general-purpose circuits, chips, firmware, etc., and the three can be separate devices or integrated into one device. The embodiments of the present disclosure are not limited to this case.

The beneficial effects that the wireless electronic device provided by some embodiments of the present disclosure can achieve are basically the same as the beneficial effects of the wireless charging and communication circuit provided by the embodiments of the present disclosure, which are not repeated herein again.

Some embodiments of the present disclosure also provide a wireless electronic device, which includes a power supply, a main controller, a communication controller, a power supply controller, and the wireless charging and communication circuit provided by any one of the embodiments of the present disclosure.

Figure 13:
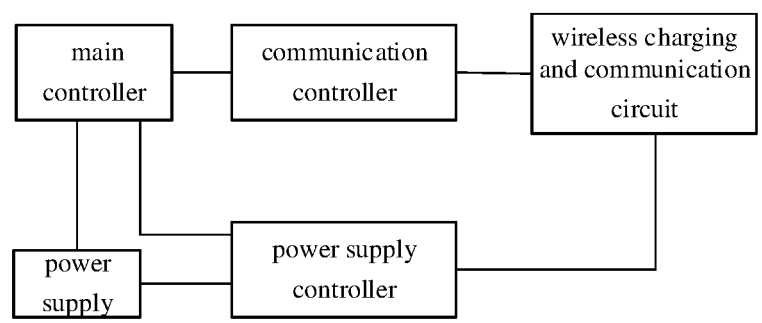
FIG. 13 is a schematic block diagram of yet another wireless electronic device provided by some embodiments of the present disclosure.

As illustrated in FIG. 13, the communication controller and the power supply controller are both electrically connected to the wireless charging and communication circuit, the main controller is electrically connected to the communication controller and the power supply controller, and the power supply is electrically connected to the main controller and the power supply controller. For example, the wireless charging and communication circuit includes a transmitting inductor L2. For example, the main controller, the communication controller and the power supply controller cooperate with each other to control the wireless charging and communication circuit, for example, to provide the aforementioned signals to the wireless charging and communication circuit, and to collect signals generated by the wireless charging and communication circuit.

It should be noted that the main controller, the communication controller and the power supply controller can be dedicated or general-purpose circuits, chips, firmware, etc., and the three can be separate devices or integrated into one device. The embodiments of the present disclosure are not limited to this case.

The beneficial effects of the wireless electronic device provided by the embodiments of the present disclosure are basically the same as those of the wireless charging and communication circuit provided by the embodiments of the present disclosure, which are not repeated herein again.

Those skilled in the art can understand that each block in these structural block diagrams and/or block diagrams and/or flow diagrams and combinations of blocks in these block diagrams and/or block diagrams and/or flow diagrams may be implemented by computer program instructions. Those skilled in the art can understand that these computer program instructions may be provided to a general-purpose computer, a professional computer, or a processor implementing other programmable data processing method to implement the scheme specified in the plurality of blocks or blocks of the structural block diagrams and/or block diagrams and/or flow diagrams of the present disclosure by the computer or the processor implementing other programmable data processing method.

Those skilled in the art can understand that steps, measures, and schemes in various operations, methods and processes that are discussed in this disclosure can be alternated, modified, combined, or deleted. Furthermore, other steps, measures and schemes in various operations, methods and processes already discussed in this disclosure can also be alternated, changed, rearranged, decomposed, combined or deleted. Further, steps, measures, and schemes of various operations, methods, and processes disclosed in this disclosure in the prior art can also be alternated, modified, rearranged, decomposed, combined, or deleted.

The above is only part of the embodiments of the present disclosure, and it should be pointed out that for those of ordinary skill in the art, several improvements and embellishments can be made without departing from the principles of the present disclosure, and these improvements and embellishments should also be regarded as the scope of protection of the present disclosure.

What is claimed is:

1. A charging circuit, comprising a receiving circuit and a signal processing circuit coupled to the receiving circuit,
    wherein the receiving circuit is configured to receive electric energy wirelessly transmitted by a transmitting circuit and wirelessly transmit a feedback signal to the transmitting circuit according to the electric energy; and
    the signal processing circuit is configured to receive a control signal wirelessly transmitted by the transmitting circuit and process the control signal,
    wherein the signal processing circuit comprises a decoding circuit, and the decoding circuit is coupled to the receiving circuit; and
    the decoding circuit is configured to receive the control signal wirelessly transmitted by the transmitting circuit and decode the control signal,
    wherein the decoding circuit comprises a first signal input terminal, a second signal input terminal, a high-pass filtering circuit, a switch circuit, a third capacitor, a resistance-capacitance charging circuit, a comparison circuit, a fourth capacitor, and a signal output terminal;

the first signal input terminal is coupled to the receiving circuit and is configured to receive the control signal transmitted by the transmitting circuit;

a first terminal of the high-pass filtering circuit is coupled to the first signal input terminal, and a second terminal of the high-pass filtering circuit is coupled to a first terminal of the switch circuit;

a second terminal of the switch circuit is coupled to the comparison circuit, and a third terminal of the switch circuit is coupled to a first voltage terminal;

a first terminal of the third capacitor is coupled to the second signal input terminal, and a second terminal of the third capacitor is coupled to the first voltage terminal;

a first terminal of the resistance-capacitance charging circuit is coupled to the second signal input terminal, and a second terminal of the resistance-capacitance charging circuit is coupled to the first voltage terminal;

the comparison circuit is coupled to the resistance-capacitance charging circuit, the second signal input terminal, the signal output terminal, and the first voltage terminal; and a first terminal of the fourth capacitor is coupled to the signal output terminal, and a second terminal of the fourth capacitor is coupled to the first voltage terminal.

2. The charging circuit according to claim 1, wherein the receiving circuit comprises a first energy storage circuit, a first capacitor, a rectification circuit, and a feedback circuit;

a first terminal of the first energy storage circuit is coupled to a first terminal of the first capacitor, a second terminal of the first energy storage circuit is coupled to a first terminal of the rectification circuit, and the first energy storage circuit is configured to receive the electric energy wirelessly transmitted by the transmitting circuit;

a second terminal of the first capacitor is coupled to a second terminal of the rectification circuit;

a third terminal of the rectification circuit is coupled to a first voltage terminal, and the rectification circuit is configured to convert the electric energy into a direct-current voltage and output the direct-current voltage to the feedback circuit; and the feedback circuit is coupled to the rectification circuit, and is configured to generate the feedback signal according to the direct-current voltage and wirelessly transmit the feedback signal to the transmitting circuit through the first energy storage circuit.

3. The charging circuit according to claim 2, wherein the feedback circuit comprises a load modulation control terminal, a first switch sub-circuit, a load modulation resistor, and a load resistor;

the load modulation control terminal is coupled to a first terminal of the first switch sub-circuit;

a second terminal of the first switch sub-circuit is coupled to a first terminal of the load modulation resistor, a third terminal of the first switch sub-circuit is coupled to the first voltage terminal, and the first switch sub-circuit is configured to receive a modulation signal, input from the load modulation control terminal, for modulating a load and to be turned on or turned off according to the modulation signal;

a first terminal of the load resistor is coupled to a second terminal of the load modulation resistor and the rectification circuit, and a second terminal of the load resistor is coupled to the first voltage terminal; and the load modulation resistor and the load resistor are configured to modulate a resistance value of the feedback circuit, according to a turn-on state and a turn-off state of the first switch sub-circuit, to form the feedback signal.

4. The charging circuit according to claim 2, wherein the feedback circuit comprises a load modulation control terminal, a second switch sub-circuit, a load modulation capacitor, and a matching capacitor;

the load modulation control terminal is coupled to a first terminal of the second switch sub-circuit;

a second terminal of the second switch sub-circuit is coupled to a first terminal of the load modulation capacitor, and a third terminal of the second switch sub-circuit is coupled to the first voltage terminal;

a first terminal of the matching capacitor is coupled to the second terminal of the first capacitor, and a second terminal of the matching capacitor is coupled to the second terminal of the first energy storage circuit; and a second terminal of the load modulation capacitor is coupled to the first terminal of the matching capacitor.

5. The charging circuit according to claim 1, wherein the comparison circuit comprises a comparator and a logic inversion circuit, and the decoding circuit further comprises a resistance voltage division circuit;

a non-inverting terminal of the comparator is coupled to the second terminal of the switch circuit, an inverting terminal of the comparator is coupled to the resistance voltage division circuit, a first power supply terminal of the comparator is coupled to the second signal input terminal, a second power supply terminal of the comparator is coupled to the first voltage terminal, and an output terminal of the comparator is coupled to a first input terminal of the logic inversion circuit;

a second input terminal of the logic inversion circuit is coupled to the second signal input terminal, and an output terminal of the logic inversion circuit is coupled to the signal output terminal; and a first terminal of the resistance voltage division circuit is coupled to the second signal input terminal, and a second terminal of the resistance voltage division circuit is coupled to the first voltage terminal.

6. The charging circuit according to claim 1, wherein the comparison circuit comprises a trigger circuit, and the decoding circuit further comprises a fifth capacitor;

a first trigger terminal of the trigger circuit and a second trigger terminal of the trigger circuit are both coupled to the second terminal of the switch circuit, a power supply terminal of the trigger circuit and a reset terminal of the trigger circuit are both coupled to the second signal input terminal, a control terminal of the trigger circuit is coupled to a first terminal of the fifth capacitor, a discharge terminal of the trigger circuit and a ground terminal of the trigger circuit are both coupled to the first voltage terminal, and an output terminal of the trigger circuit is coupled to the signal output terminal; and a second terminal of the fifth capacitor is coupled to the first voltage terminal.

7. An electronic device, comprising a main controller, a communication controller, a power receiving controller, and the charging circuit according to claim 1, wherein the power receiving controller and the communication controller are both coupled to the charging circuit; and the power receiving controller and the communication controller are both coupled to the main controller.

8. The electronic device according to claim 7, further comprising an electronic tag, wherein the electronic tag is coupled to the power receiving controller.

9. The electronic device according to claim 8, wherein the electronic tag comprises an electronic ink screen, and the electronic ink screen is configured to be supplied with power by the power receiving controller.

10. An electronic device, comprising a main controller, a communication controller, a power receiving controller, and the charging circuit according to claim 2,
wherein the power receiving controller and the communication controller are both coupled to the charging circuit; and
the power receiving controller and the communication controller are both coupled to the main controller.

11. A charging circuit system, comprising a receiving circuit, a signal processing circuit, and a transmitting circuit,
wherein the receiving circuit is configured to receive electric energy wirelessly transmitted by the transmitting circuit and wirelessly transmit a feedback signal to the transmitting circuit according to the electric energy;
the signal processing circuit is configured to receive a control signal wirelessly transmitted by the transmitting circuit and process the control signal; and
the transmitting circuit is configured to wirelessly transmit the electric energy to the receiving circuit, receive the feedback signal of the receiving circuit, and wirelessly transmit the control signal to the receiving circuit;
the signal processing circuit is coupled to the receiving circuit,
the signal processing circuit comprises a decoding circuit, and the decoding circuit is coupled to the receiving circuit; and
the decoding circuit is configured to receive the control signal wirelessly transmitted by the transmitting circuit and decode the control signal,
wherein the decoding circuit comprises a first signal input terminal, a second signal input terminal, a high-pass filtering circuit, a switch circuit, a third capacitor, a resistance-capacitance charging circuit, a comparison circuit, a fourth capacitor, and a signal output terminal;
the first signal input terminal is coupled to the receiving circuit and is configured to receive the control signal transmitted by the transmitting circuit;
a first terminal of the high-pass filtering circuit is coupled to the first signal input terminal, and a second terminal of the high-pass filtering circuit is coupled to a first terminal of the switch circuit;
a second terminal of the switch circuit is coupled to the comparison circuit, and a third terminal of the switch circuit is coupled to a first voltage terminal;
a first terminal of the third capacitor is coupled to the second signal input terminal, and a second terminal of the third capacitor is coupled to the first voltage terminal;
a first terminal of the resistance-capacitance charging circuit is coupled to the second signal input terminal, and a second terminal of the resistance-capacitance charging circuit is coupled to the first voltage terminal;
the comparison circuit is coupled to the resistance-capacitance charging circuit, the second signal input terminal, the signal output terminal, and the first voltage terminal; and
a first terminal of the fourth capacitor is coupled to the signal output terminal, and a second terminal of the fourth capacitor is coupled to the first voltage terminal.

* * * * *